United States Patent [19]

Razzacki

[11] Patent Number: 4,532,823
[45] Date of Patent: Aug. 6, 1985

[54] CONCENTRIC SHIFT RAIL MECHANISM

[75] Inventor: Syed T. Razzacki, Troy, Mich.

[73] Assignee: Chrysler Corporation, Highland Park, Mich.

[21] Appl. No.: 539,509

[22] Filed: Oct. 6, 1983

[51] Int. Cl.$^4$ ............................................. G05G 9/12
[52] U.S. Cl. ..................................... 74/473 R; 74/375
[58] Field of Search ..................... 74/375, 473 R, 475, 74/477

[56] References Cited

U.S. PATENT DOCUMENTS

| | | | |
|---|---|---|---|
| 1,826,407 | 10/1931 | Tenney | 74/477 |
| 2,951,392 | 9/1960 | Backus | 74/475 X |
| 3,479,007 | 11/1969 | Buell | 308/4 R X |
| 3,479,900 | 11/1969 | Mays | 74/475 X |
| 4,222,281 | 9/1980 | Mylenek | 74/476 X |
| 4,275,612 | 6/1981 | Silvester | 74/473 R |
| 4,323,003 | 4/1982 | Clippard | 308/4 R X |
| 4,485,688 | 12/1984 | Muth et al. | 74/473 R |

Primary Examiner—William E. Tapolcai
Attorney, Agent, or Firm—Edward P. Barthel

[57] ABSTRACT

Transmission shift rail assembly has a single shift rod slidably received within an outer concentric tubular member. A first-second (1-2) speed fork is supported on the tubular member for movement therewith. A third-fourth (3-4) speed fork is slidably supported on the tubular shift rail for axial movement relative thereto. A fifth speed fork is fixedly retained on one free end of the shift rod. The tubular member has a pair of diametrically opposed elongated control slots receiving a transverse cross pin which extends from the fifth speed shifter through the tubular member and rod. Journal bearings are provided between the outer tubular member and the inner shift rod. This arrangement enables the 1-2 speed fork having the highest shifting resistance, to be readily shifted on the journalled tubular member in a predetermined manner reducing gear shift lever operating efforts.

3 Claims, 6 Drawing Figures

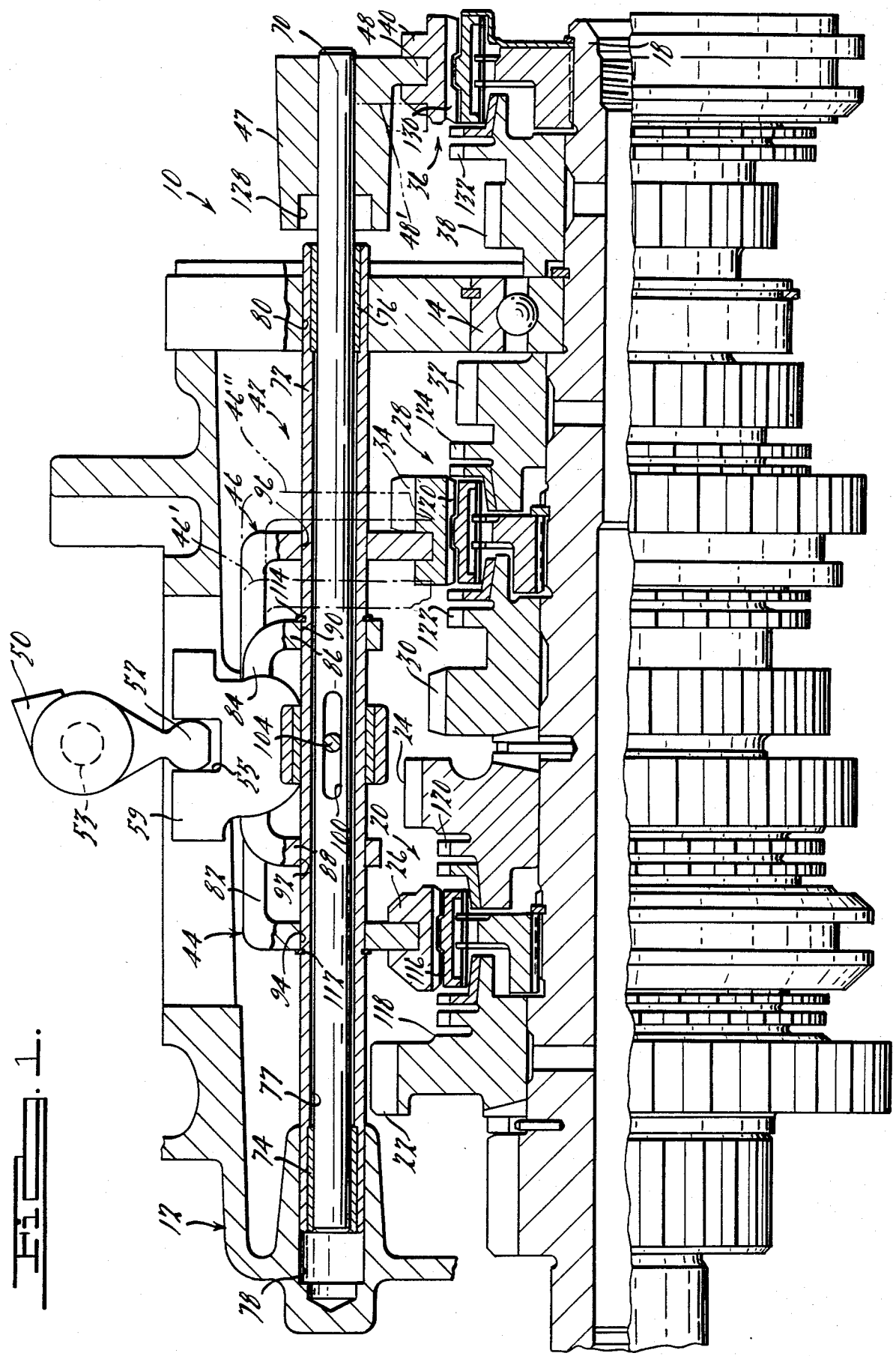

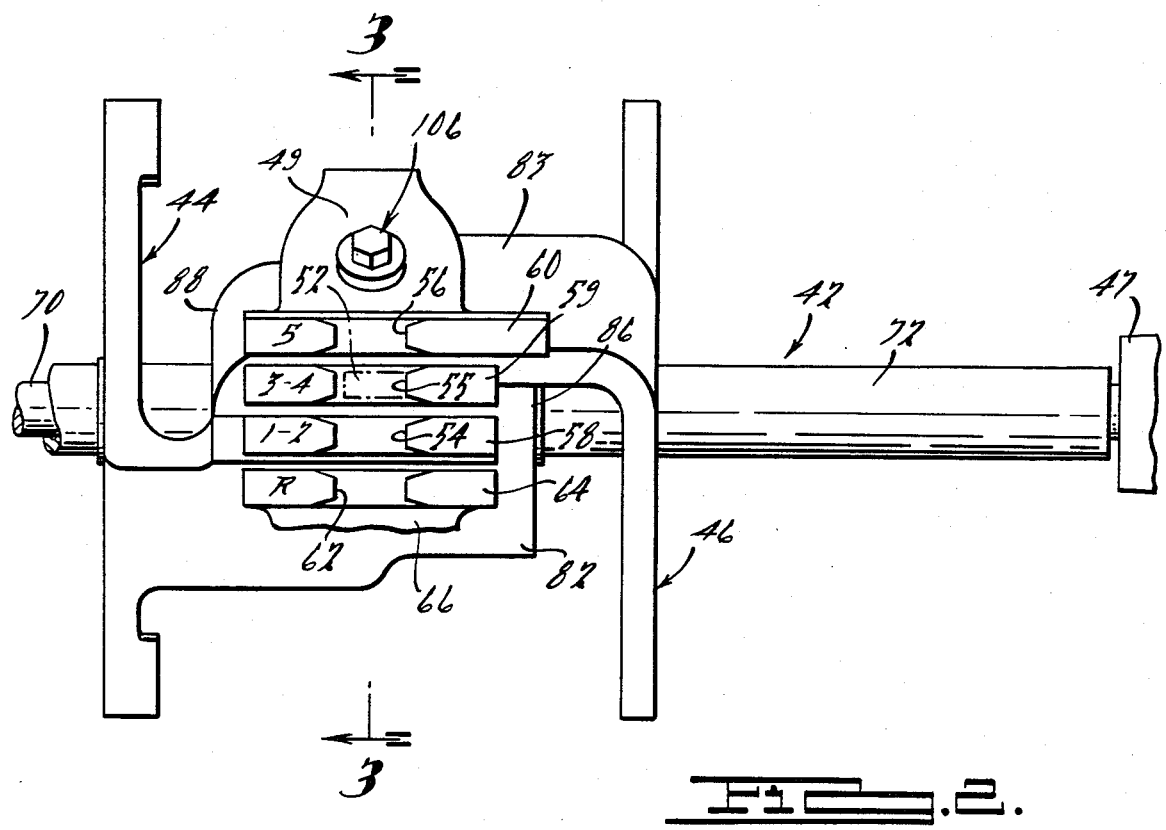
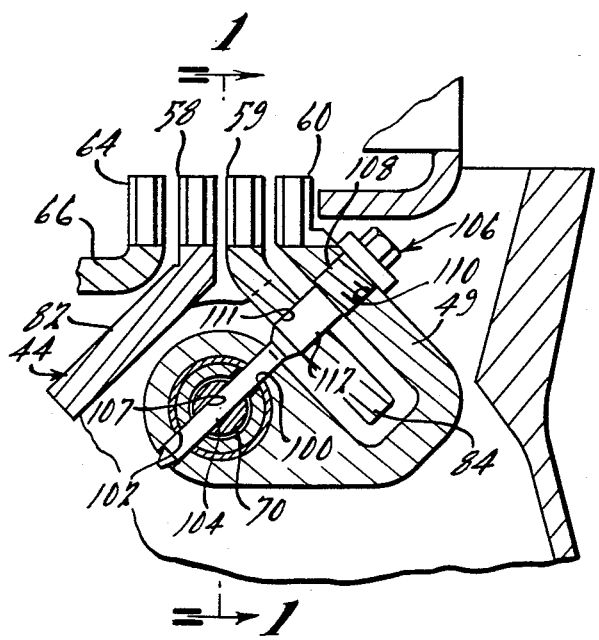
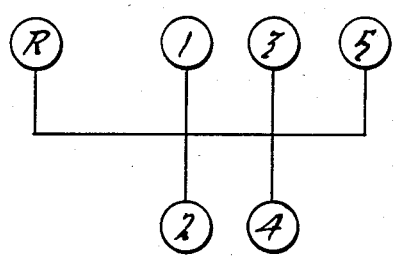

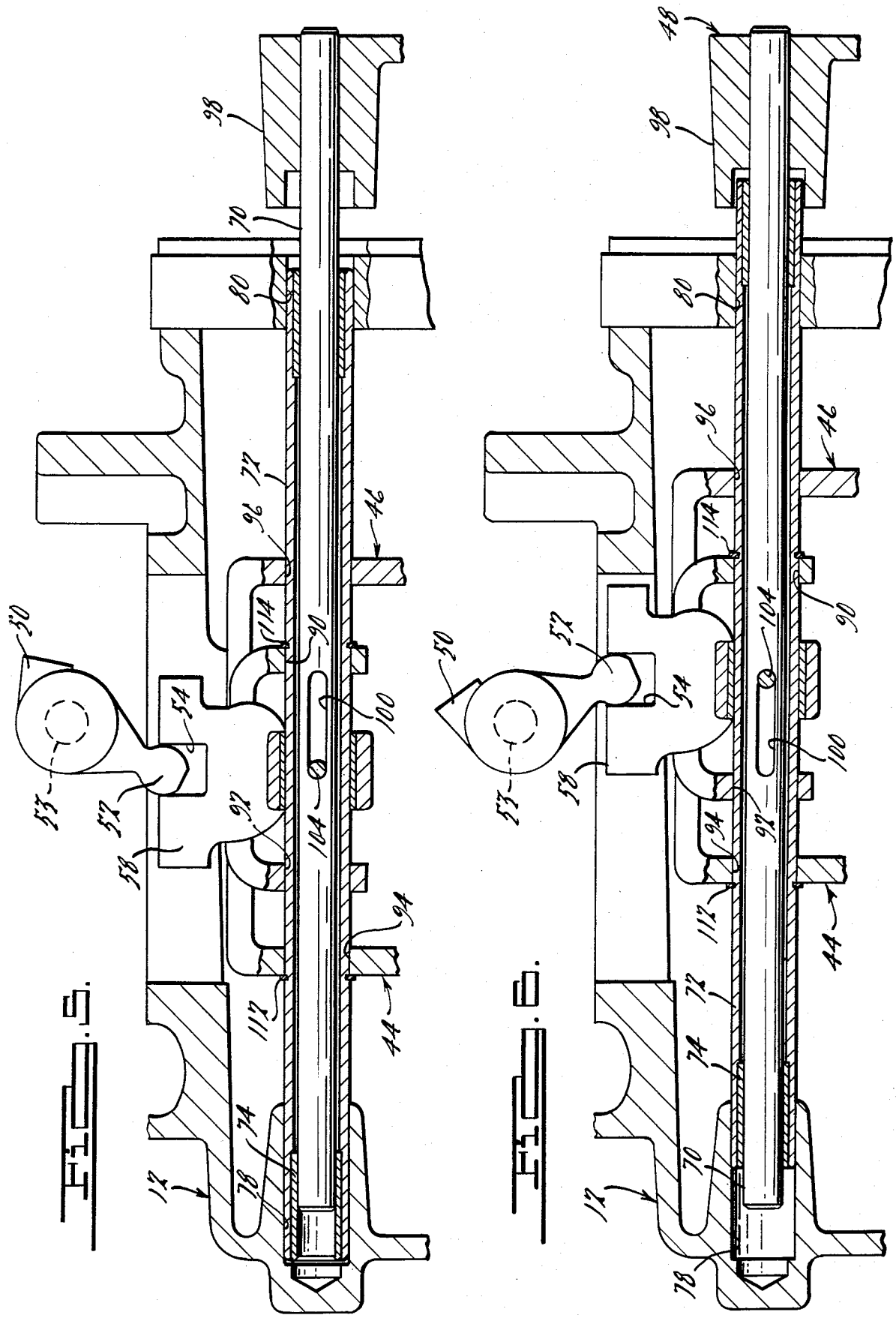

CONCENTRIC SHIFT RAIL MECHANISM

BACKGROUND OF THE INVENTION

This invention relates generally to automotive transmissions and more particularly to a sliding clutch type manual transmission incorporating a shift rail mechanism to minimize the effort required to shift the speed gear forks.

In recent years there has been increased use of single rail shift mechanisms because of their space savings and weight reduction advantages. An example of one such single shift rail manual transmission is shown in U.S. Pat. No. 4,222,281 issued Sept. 16, 1980 to Mylenek. With the advent of five speed gear boxes shift have required more effort by the driver to shift the various gears. Thus, there remains a need in the art to provide an improved single rail shifting mechanism that is compact while requiring minimal shifting effort by the driver.

SUMMARY OF THE INVENTION

The primary object of this invention is to reduce gear hift lever operating efforts. To that end there is provided a single rail shift mechanism having an inner rod slidable within an outer slidable tubular member. A first and second (1-2) speed fork is held fixed on the tubular member. Selective engagement of the 1-2 fork by the gear selector actuates the tubular member and moves the 1-2 shift fork fore or aft to complete shifting in either the first or second gear of the transmission. Suitable bushings are press-fitted into each end of the tubular member bore to provide free reciprocal movement of the tubular member relative to the rod in the direction of its longitudinal axis.

A third and fourth (3-4) speed fork is slidably mounted on the tubular member to provide fore and aft reciprocal travel into third and fourth gears. A fifth speed shift fork is pinned at the free end of the shifter rod. Axial force on the one side of the fifth speed shifter notch actuates the rod and carries the fork in or out of fifth gear. A shift rod crosspin extends through a tap-drilled hole in the fifth speed shifter to control its position. This crosspin also extends through aligned control slots in the tubular rail to correctly position the fifth shifter. The arrangement minimizes binding of the 1-2 speed fork because the journaled tubular member slides freely relative to the rod during a first or second speed shift.

BRIEF DESCRIPTION OF THE DRAWINGS

Further objects and advantages of the invention will become apparent to those skilled in the art upon reference to the following description and accompanying drawings in which:

FIG. 1 is a fragmentary vertical sectional view, partly in elevation, of the concentric rail shift assembly and output gear of a five speed manual transmission;

FIG. 2 is a fragmentary top elevational detail view of the concentric rail shift assembly in its neutral position;

FIG. 3 is a vertical sectional view taken on line 3—3 of FIG. 2;

FIG. 4 shows the shift pattern for the manual five speed transmission;

FIG. 5 is a fragmentary, vertical sectional view of the concentric rail shift mechanism in its first speed mode; and FIG. 6 is a view similar to FIG. 5 showing the mechanism in its second speed mode.

DETAILED DESCRIPTION OF THE PREFERRED EMBODIMENT

Referring now in detail to the drawings, a portion of a transmission 10 in FIG. 1 is illustrated as being comprised of a case 12 having coaxially situated bearing assemblies only one of which is shown at 14. These bearings serve to journal support spaced portions of a transmission input shaft 18.

A synchronizer clutch 20 is provided in conjunction with first and second speed gears 22 and 24, respectively, and clutch sleeve 26. The synchronizer clutch 20, as well as the synchronizer clutch illustrated at 28, are well-known in the art. Synchronizer 20 functions to synchronize the rotational speeds of gears 22 and 24 and sleeve 26 during periods of changing speeds. The synchronizer 28 is used with third and fourth speed gears 30 and 32, respectively, and clutch sleeve 34 to synchronize their rotational speeds.

For fifth speed drive operation, a third synchronizer clutch 36 with a fifth speed gear 38 and clutch sleeve 40 are provided in a manner similar to the synchronizers 20 and 28.

FIG. 1 shows a concentric shift rail assembly which carries dual speed shifter forks 44, 46 and a single fifth speed shifter lug 47. In the disclosed embodiment the fork 44 is the 1-2 speed fork and the fork 46 is the 3-4 speed fork. The shifter lug 47 is the prime mover for the fifth speed fork 48 by means of its shifter 49 in a manner to be explained. A manually actuated gear selector 50 is pivotally supported in the case 12 by conventional means, not shown.

As seen in FIGS. 2 and 3 the selector 50 lower end has finger 52 longitudinally selectively movable about pivot bar 53 within notches 54, 55 or 56 of the forks 44, 46 and 48, respectively. The notches 54, 55, 56 are each defined by their respective yoke-like portions 58, 59 and 60. A fourth reverse gear notch 62 is formed in yoke portion 64 of reverse gear bracket partially shown at 66. The finger 52 is longitudinally movable by selector 50 for selective movement into each of the four notches 54, 55, 56 and 62. It will be noted that in the transmission's neutral position of FIG. 2, the notches 54, 55, 56 and 62 are transversely aligned. Also in neutral the finger 52 (shown in Phantom) is in registration with the 3-4 notch 55 of the 3-4 fork.

The shift rail assembly 42 includes a shift rod 70 slidably received within an outer tubular member 72 by means of a pair of sleeve journal bearings 74 and 76 fixed at each open end of tubular member through bore 77. It will be noted that the tubular member 72 has an axial length which is a predetermined distance shorter than the rod 70. As seen in FIG. 1 the tubular member 72 has its one lefthand bearing end 74 slidably received in casing blind hole 78. The tubular member opposite righthand bearing end 76 is slidably received in the casing through hole 80. Thus, the tubular member 72 is mounted about the shift rod 70 for axial sliding movement fore-and-aft in the direction of its longitudinal axis relative to the shift rod 70.

As seen in FIGS. 1 and 2 the forks 44 and 46 each have a longitudinally extending head portion 82 and 84 respectively. Each fork head portion 82,84 has a normally extending transverse flange 86 and 88 respectively. The fork flanges are formed with apertures 90 and 92 aligned with apertures 94 and 96 of their associated forks 44 and 46. The apertures 90, 92, 94 and 96 are sized for slidable reception on the tubular member 72. The shift rod 70 righthand end extends a determined distance past the sleeve bearing 76 and has the hub portion 47 of the fifth fork 48 fixedly secured by a through pin on the shift rod righthand end.

The tubular member 72 has a pair of aligned elongated longitudinal control slots 100 and 102 formed adjacent its center. As seen in FIG. 3, the diametrically opposed slots 100,102 are sized to receive the reduced end 104 of a crosspin 106 located in rod bore 107. The crosspin 106 has a portion 108 threadably received in fifth shifter 49 aperture 110 so that the shifter lug 47, shift rod 70, and fifth speed fork 48 move as a unit. The 3–4 fork head portion 84 is also formed with a longitudinal control slot 111 which receives the enlarged portion 112 of the crosspin 106. The slot 111 controls the longitudinal extent of travel of the 3–4 fork. The cross pin 106 has its portion 104 reduced to a predetermined diameter to minimize the material removed from the rod bore 107 to insure its structural integrity.

When the shift rail assembly is in its position shown in FIGS. 1 and 2, the transmission is in neutral with pin portion 104 centered in its control slots 100 and 102 and pin portion 112 centered in control slot 111. That is, there is no power being transmitted from any of the cluster gears to the main or output shaft 18. The forks 44 and 46 and shifter 49 are longitudinally movable at predetermined times by selector 50 moving their associated gears axially on the main shaft 18. This achieves the desired power transmission from the input shaft (not shown) to the output shaft 18.

For example, if first gear is desired the selector 50 is first pivoted causing its finger 52 to move out of its neutral location in notch 55 and into registry with notch 54 of the 1-2 fork. Next, with finger 52 registering with notch 54, the selector 50 is pivoted causing the tubular member 72 to move axially to the left (see FIG. 5). It will be noted that the 1-2 speed fork 44 is suitably fixed on the tubular member 72, preferably by means of split rings 112 and 114 snapped into annular grooves in the sleeve 72. Accordingly, the 1-2 fork 44 travels axially to the left with the tubular member 72 thereby moving the 1-2 fork clutch sleeve 26 into its first gear position. In this mode internal splines 116 of the clutch sleeve 26 will mesh with external splines 118 of the first speed gear 22 in a conventional manner by the synchronizer 20.

The function of the synchronizer 20 is to synchronize the rotational speeds of the gears 22 and 24 and sleeve 26 during periods of changing speeds. Once the gears are brought up to speed power will be transmitted from a gear on the input shaft (not shown) to first speed gear 22 fixed on the main output shaft 16.

If second gear is desired the selector 50 is pivoted causing finger 52 to contact the right side face of notch 54 resulting in the tubular member 72 moving axially to the right (See FIG. 6). The tubular member 72 thus carries the 1-2 speed fork 44 to the right. This causes its clutch sleeve 26 to move to its righhand position wherein its internal splines 116 mesh with external splines 120 of the second gear 24 by action of the synchronizer 20.

If third speed is desired, the selector 50 is pivoted until its finger 52 is received within the 3-4 fork notch 56. With lever end 52 remaining in notch 56 the selector is again pivoted wherein the finger 52 contacts the left side face of notch 56. As a result the 3-4 fork 46 slides on the tubular member 72 until the 3-4 fork 46 moves its clutch sleeve 34 axially to the left as shown in its single prim phantom line position 46' in FIG. 1. In this position the clutch sleeve 34 internal splines 120 mesh with the external splines 122 of third speed gear 30. Thus, in the third speed mode the shift rod 70 remains as shown in FIG. 1 with its cross pin portion 104 centered in slots 100 and 102.

If fourth speed is selected, the selector 50 is pivoted causing the finger 52 to contact the right side face of notch 56 sliding the 3-4 fork 46 to the right. In this position the clutch sleeve 34 internal splines 120 mesh with external splines 124 of the fourth gear 32. Again, as with the third speed gear ratio the 3-4 fork 46 slides on the tubular member 72 to its double prim phantom line position 46' shown in FIG. 1 while the crosspin 104 and rod 76 remain stationary.

If fifth speed drive operation is desired, the selector 50 is pivoted until its finger 52 is received in the notch 56 of bracket 66. With the finger 52 remaining in notch 56 the selector lever is again pivoted such that the finger 52 contacts the left side face of the notch 62. This causes the fifth speed fork and rod 70 to slide readily to the left within the tubular rail 72 on end sleeve bearings 74 and 76. As fifth speed fork 47 is fixed on rod 70 the fork 48 is moved to the left to the phantom line position 48' shown in FIG. 1. It will be noted that the lug 47 has a countersunk hole 128 which telescopes over the righthand end of the shift rail assembly 42. In this position the clutch sleeve 40 internal splines 130 mesh with external splines 132 of the fifth gear 38.

What is claimed is:

1. In a manual gear selecting and shifting mechanism for a vehicle transmission change speed gearing including, a transmission casing, means for mounting a selector on said casing to control the selection of the desired speed gearing on a main gear shaft, a shifter rail assembly adapted to control the shifting movement of the speed gearing, said shifter rail assembly comprising;

a tubular member mounted on said casing for axial fore and aft sliding movement in the direction of its longitudinal axis;

a shift rod received within said tubular member for axial sliding movement relative thereto;

means fixedly mounting first operator means on said tubular member for movement therewith;

means mounting second operator means on said tubular member such that said second operator means is free to slide fore and aft relative to said tubular member;

each said first and second operator means respectively engaging an associated clutch sleeve;

a pair of diametrically opposed longitudinally extending control slots formed in said tubular member;

a control pin extending transversely through said shift rod and slidably engaged within each said control slot;

manual selector means operative for engaging said first operator means for axial reciprocal sliding movement of said first operator means and said tubular member fore and aft relative to said shift rod;

said control slots and pin enabling said tubular member to slide a predetermined distance fore or aft from its neutral position whereby said first operator means shifts its associated clutch sleeve into its respective fore or aft speed gear engaging position;

said manual selector means operative for engaging said second operator means for axial sliding such that said second operator means is free to slide axially relative to said tubular member a predetermined distance fore or aft of said cross pin neutral position whereby said second operator means shifts its associated clutch sleeve into its respective fore or aft gear engaging position; and journal bearing means intermediate said tubular member and said shift rod such that said first operator means readily moves said gearing into its fore or aft gear engaging position thereby reducing manual gear shift operating effort.

2. In a manual gear selecting and shifting mechanism for a vehicle transmission change speed gearing including, a transmission casing, means for mounting a selector on said casing to control the selection of the desired speed gearing on a main gear shaft, a shifter rail assembly adapted to control the shifting movement of the speed gearing, said shifter rail assembly comprising;

a tubular member mounted on said casing for axial fore and aft sliding movement in the direction of its longitudinal axis, said tubular member having a through bore;

a shift rod received within said tubular member for axial sliding movement relative thereto;

means fixedly mounting a first fork on said tubular member for movement therewith;

means mounting a second fork on said tubular member such that said second fork is free to slide fore and aft relative to said tubular member;

each said first and second forks respectively engaging an associated clutch sleeve;

a pair of diametrically opposed longitudinally extending control slots formed in said tubular member;

a control pin extending transversely through a bore in said shift rod and slidably engaged within each said control slot;

manual selector means operative for engaging said first fork for axial sliding movement of said first fork and said tubular member fore and aft relative to said shift rod;

said control slots and pin enabling said tubular member to slide a predetermined distance fore or aft from its neutral position whereby said first fork shifts its associated clutch sleeve into its respective fore or aft speed gear engaging position;

said manual selector means operative for engaging said second fork for axial sliding such that said second fork is free to slide axially relative to said tubular member a predetermined distance fore or aft of said cross pin neutral position whereby said second fork shifts its associated clutch sleeve into its respective fore or aft gear engaging position; and a pair of sleeve bearings concentrically fixed within each open end of said tubular member through bore and sized to journally receive said shift rod therein for relative journalled movement therebetween such that said first fork readily moves said gearing into its respective fore or aft gear engaging position thereby reducing manual gear shift operating effort.

3. The mechanism as set forth in claim 2 wherein said control pin having a predetermined diameter with a smaller diameter end portion reduced to a predetermined diameter to minimize the size of said shift rod through bore and thus insure the structural integrity of said rod.

* * * * *